T. A. GRIFFITH.
DRIVING MECHANISM.
APPLICATION FILED FEB. 9, 1918.

1,315,115.

Patented Sept. 2, 1919.

Witnesses.
F. C. Gilson.
R. M. Smith.

Inventor
Thomas A. Griffith.
By Victor J. Evans.
Attorney

UNITED STATES PATENT OFFICE.

THOMAS A. GRIFFITH, OF KANSAS CITY, MISSOURI.

DRIVING MECHANISM.

1,315,115. Specification of Letters Patent. Patented Sept. 2, 1919.

Application filed February 9, 1918. Serial No. 216,282.

*To all whom it may concern:*

Be it known that I, THOMAS A. GRIFFITH, a citizen of the United States, residing at Kansas City, in the county of Jackson and State of Missouri, have invented new and useful Improvements in Driving Mechanism, of which the following is a specification.

This invention relates to driving mechanism and while specially designed for use in connection with the driving gearing of motor vehicles, the improved mechanism may be used in other connections for transmitting motion from one rotary member to another rotary member.

The main object of the invention is to obtain increased power between the driving and driven elements of the machine.

With the above and other objects in view, the invention consists in the novel construction, combination and arrangement of parts, herein described, illustrated and claimed.

In the accompanying drawings:—

Figure 1:
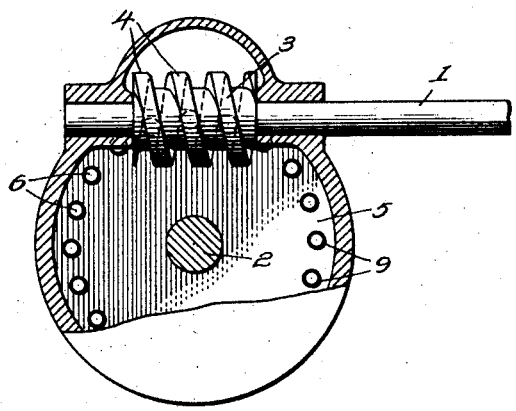
Figure 1 is a side elevation partly in section of the improved driving mechanism.

Referring to the drawings 1 designates the driving shaft and 2 the driven shaft of the improved driving mechanism.

The driving shaft has fast thereon a worm 3 having a single thread or a plurality of threads 4 sufficient in number to simultaneously engage and coöperate with a number of pins on a driven wheel or disk 5 fast on the driven shaft 2.

Figure 2:
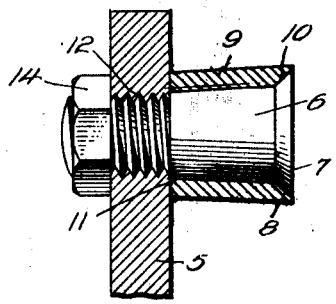
Fig. 2 is a fragmentary sectional view showing the formation of one of the pins, the sleeve or roller thereof, and the connection between the pins and the rotary disk or driven wheel.

The wheel 5 which is preferably of disk like formation is provided with an annular series of laterally projecting pins 6 each of greater diameter at its outer end than at its inner end, the pin gradually contracting in diameter from its outer toward its inner end as clearly shown in Fig. 2. The outer end of each pin 6 is flared or formed with a flange 7 having an inclined or uncut inner face 8 forming a cone bearing. Surrounding each pin 6 is a sleeve or roller 9 which also has a beveled face 10 corresponding and coöperating with the conical bearing face 8 of the pin 6. The inner end of the sleeve 9 works in close proximity to or in contact with the adjacent face of the disk 5.

At its inner end, the main body of the pin 6 is reduced to form an annular shoulder 11 which bears hard against the adjacent face of the disk 5. The end portion of the pin which is reduced by the formation of the shoulder 11 is threaded at 12 and screwed through a threaded opening 13 in the disk or wheel 5. The pin 6 is additionally fastened securely to the member 5 by means of a nut 14 screwed upon the threaded portion or shank of the pin. This forms a firm and reliable connection between each pin and the disk 5 by which it is carried.

Where the arrangement of the driving mechanism permits, I intend to provide the wheel or disk 5 with two series of pins 6, there being one series on each side of the member 5. Furthermore the pins on one side of the member 5 may alternate or stagger with relation to the pins on the other side of said member 5. This will admit of the use of pins of maximum diameter particularly adapting the construction to heavy duty trucks and other motor vehicles. In motor vehicle practice, the shaft 1 will correspond with the drive shaft of the vehicle and the shaft 2 will correspond with the driving axle of the machine. As shown in Fig. 1, at least two of the pins 6 are in simultaneous coöperation at all times with the threads 4 of the worm gear 3. When the sleeves or rollers 9 show any appreciable wear, they may be replaced by new ones.

I claim:—

The combination of a driving shaft, a driven shaft, a worm gear fast on the driving shaft and embodying a plurality of threads, a disk like wheel fast on the driven shaft, an annular series of pins fastened to and projecting from that side of said wheel on which the driving shaft is located, each of said pins being tapered and gradually increasing in diameter toward its outer end, a flange at the outer end of each pin having a beveled inner face, and an anti-friction sleeve surrounding said pin and adapted to freely turn thereon, said worm gear having a sufficient number of threads to effect simultaneous coöperation with a plurality of pins on said wheel.

In testimony whereof I affix my signature.

THOMAS A. GRIFFITH.

Copies of this patent may be obtained for five cents each, by addressing the "Commissioner of Patents, Washington, D. C."